Feb. 5, 1952      A. J. WILLIAMS, JR      2,584,954
SELF-BALANCING ELECTRICAL SYSTEM AND METHOD
Filed May 8, 1948      2 SHEETS—SHEET 1

INVENTOR
ALBERT J. WILLIAMS JR.
BY
Woodcock and Phelan
ATTORNEYS

Feb. 5, 1952   A. J. WILLIAMS, JR   2,584,954
SELF-BALANCING ELECTRICAL SYSTEM AND METHOD
Filed May 8, 1948   2 SHEETS—SHEET 2
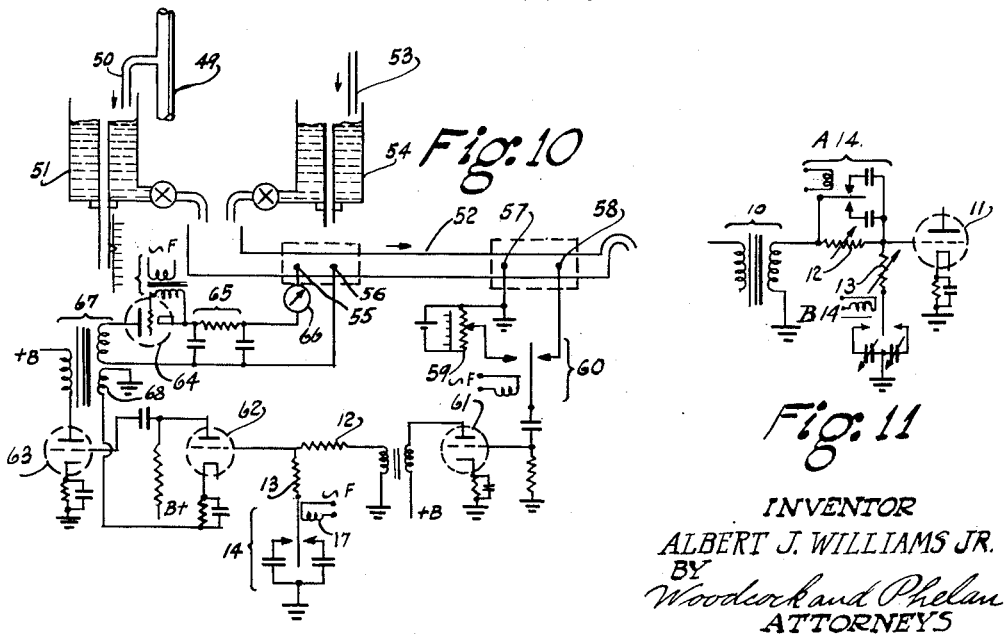
INVENTOR
ALBERT J. WILLIAMS JR.
BY
Woodcock and Phelan
ATTORNEYS Patented Feb. 5, 1952

2,584,954

UNITED STATES PATENT OFFICE 2,584,954

SELF-BALANCING ELECTRICAL SYSTEM
AND METHOD

Albert J. Williams, Jr., Philadelphia, Pa., assignor
to Leeds and Northrup Company, Philadelphia,
Pa., a corporation of Pennsylvania Application May 8, 1948, Serial No. 25,915

19 Claims. (Cl. 318—28)

1

This invention relates to self-balancing electrical systems such as are used for recording, or effecting a control in response to, the changes in magnitude of a voltage or current varying as a function of temperature, ion-concentration, or other physical, chemical or electrical condition.

In accordance with the invention, an alternating-current signal corresponding with unbalance of the system is at least in part converted to direct-current for differentiation or integration, and is reconverted to alternating current to provide a derived signal which is an infinitesimal calculus function of the original or parent signal and which is utilized in control of rebalancing of the system.

More specifically, in some forms of the invention, a synchronous converter-inverter and one or more associated capacitors are connected effectively in shunt to a series resistor in the signal channel to derive a direct-current voltage whose magnitude is a function of the history of the signal voltage, and this direct-current voltage is reconverted, upon reduction in magnitude or reversal of phase of the parent signal, by the converter-inverter to a derived signal of opposite phase to the original parent signal and which jointly with the existing parent signal controls the rebalancing: in other forms of the invention, the synchronous converter-inverter and an associated capacitor or capacitors are effectively in a shunt to the signal channel to derive a direct-current voltage whose magnitude is a function of the history of the signal, and this direct-current voltage is reconverted by the converter-inverter to an alternating-signal in control of the rebalancing.

The invention further resides in methods and systems having features of novelty hereinafter described and claimed.

For a more detailed understanding of the invention, reference is made to the accompanying drawings, in which:

Fig. 1 schematically illustrates a portion of a control-signal channel in which a vibratory type of inverter-converter is used for differentiation;

Figure 5:
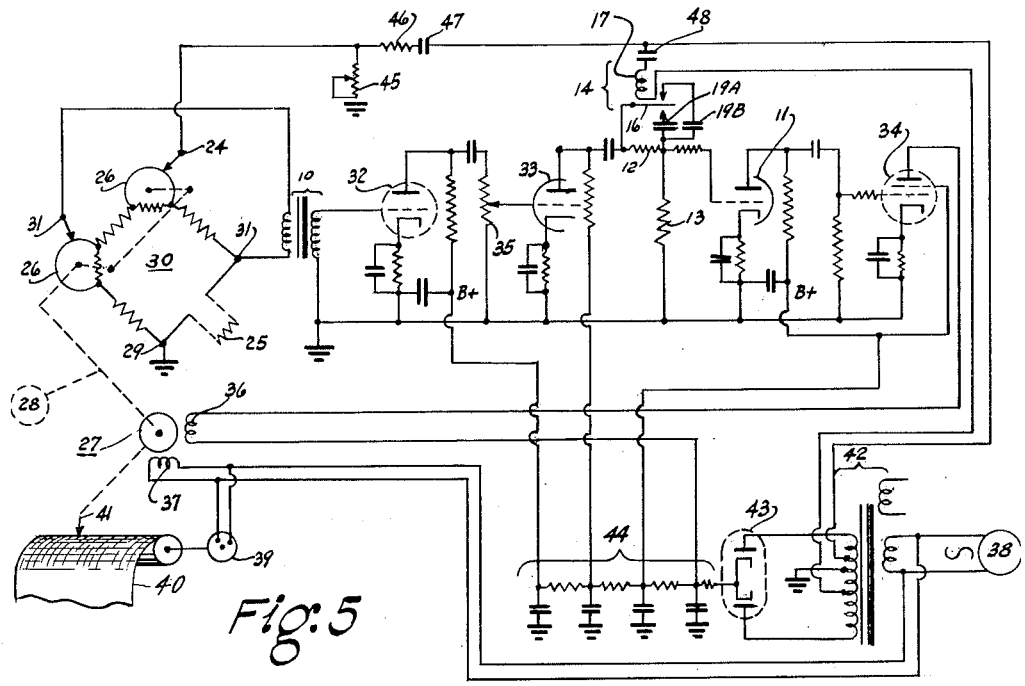
Figure 1:
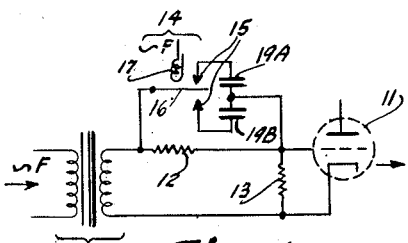

Fig. 5 schematically illustrates a self-balancing recorder system incorporating the inverter-converter of Fig. 1;

Fig. 6 schematically illustrates a portion of a control-signal channel in which the inverter-converter of Fig. 1 is used for integration;

2

Fig. 7 is an explanatory figure referred to in discussion of Fig. 6 and other figures;

Fig. 8 is a modification of Fig. 6 for additionally obtaining a proportional-control effect;

Fig. 9 is an explanatory figure referred to in discussion of Fig. 8;

Fig. 10 schematically illustrates a self-balancing control system incorporating the inverter-converter arrangement shown in Fig. 8; and Figs. 11 and 12 are additional modifications combining integration and differentiation arrangements of preceding figures.

For explanation of principles underlying the invention and for illustration of one form of inverter-converter utilizable in attainment of its purposes, reference is made to Fig. 1 in which transformer 10 is generically illustrative of means for impressing or transmitting an alternating-current voltage corresponding with the unbalance of a measuring network upon or along a signal channel including amplifier tube 11. The output voltage of transformer 10 is impressed upon a voltage-divider comprising resistor 12 in series with the input electrodes of tube 11 and resistor 13 in shunt to those electrodes. With the arrangement thus far described, the signal voltage applied to the electrodes of tube 11 would always be a fixed percentage of the output voltage of the transformer determined by the ratio of the resistance of resistor 13 to the sum of the resistances of resistors 12 and 13 and would therefore be continuously proportional to the instantaneous magnitude of the signal voltage of the transformer. However, in accordance with the present invention, there is connected in shunt to the series resistor 12 an inverter-converter which in the particular form shown in Fig. 1 comprises a vibrator whose movable contact 16 alternately engages the fixed contacts 15 in synchronism with the signal voltage applied to the voltage-divider. To effect synchronization, the driving coil 17 of the inverter-converter 14 is energized with alternating current having the same frequency F as the signal.

The flow of signal current through resistor 12 produces thereacross an alternating voltage which is rectified by the vibratory converter 14 and applied as a direct-current voltage for charging of the capacitors 19A, 19B. The inverter-converter and the capacitors form a two-terminal network. So long as the signal voltage is increasing, the alternating-current voltage applied to the two terminals of that network is increasing and accordingly the direct-current voltage of each of the condensers continues to increase, with polarity depending upon the phase relation between the signal and the driving voltage applied to coil 17. Assuming the signal voltage remains constant for an appreciable time, the conversion to direct current for charging of capacitors 19A, 19B becomes less and less as the condenser voltage approaches equality with the alternating signal voltage. The direct-current charge of the condensers is inverted or reconverted to alternating-current voltage of the same frequency and phase as that of the signal which produces it, but of opposite phase as appearing across the resistor 13 for transmission by tube 11 along the signal channel. Upon termination of the parent signal, the derived signal persists for a short time until the capacitors 19A, 19B are discharged. As above stated, the inverter-converter condenser circuit is a two-terminal network and consequently the input parent signal and output derived signal both appear across the same network terminals between which, in this modification, is connected the resistor 12. As later appears, the derived signal produces a damping or braking effect upon a self-balancing system whose signal channel includes the synchronous converter-inverter.

Figure 2:
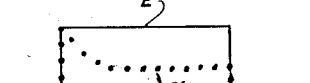
Fig. 2 is an explanatory figure referred to in discussion of the operation of Fig. 1 and later figures.

That the action may be better understood, it will be assumed, as shown in Fig. 2, that the unbalance signal, represented by curve E, abruptly increases from zero to a fixed magnitude, remains at that fixed magnitude for a given time, long compared to the period of the signal frequency, and then abruptly returns to zero. Upon initial occurrence of the unbalance, the capacitors 19A, 19B are uncharged and appear as a low impedance shunt for the series resistor 12 of the signal channel so that initially all, or substantially all, of the output voltage of transformer 10 appears across shunt resistor 13 of the signal channel for application to the input electrodes of tubes 11. This action is shown by the steep wave front portion of the dotted curve S of Fig. 2, which curve represents the vector magnitude of the input voltage applied to tube 11. During continuance of the unbalance, the inverter-converter, by charging the capacitors 19A, 19B, progressively increases the effective impedance in shunt to resistor 12, with the result that the signal voltage, appearing across load resistor 13 as the effective control voltage, becomes progressively substantially less than the output voltage E of the transformer (as shown by the curved falling portion of curve S) and ultimately assumes a steady state magnitude, assuming no further change in magnitude of the unbalance voltage E. Assuming the input signal voltage to the transformer then abruptly falls to zero, as shown in the righthand portion of Fig. 2, a derived signal appears across the load resistor 13 for a short time, progressively decreasing until the capacitors 19A, 19B are discharged, and so simulates to the tube 11 a temporary reverse unbalance of the measuring network which disappears at a rate determined by the time-constant of the discharge circuit of the capacitors.

When this arrangement is used in a self-rebalancing system, the action is actually more complex than the foregoing description because, as will become evident from later discussion of the system of Fig. 5, the unbalance voltage E at any particular instant depends not only upon the departure of the measured or controlled condition from its prior magnitude, but also upon the rebalancing operation that is taking place for reduction of the unbalance voltage.

Figure 3:
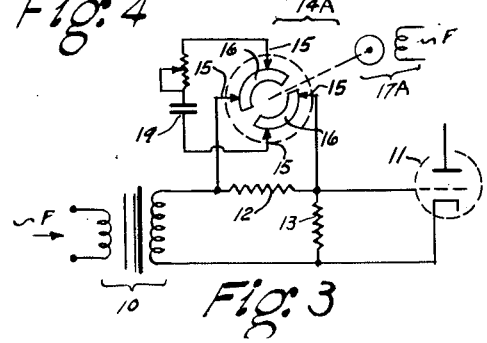

Other types of synchronous inverter-converters may be used instead of the vibratory type shown in Fig. 1; for example, as shown in Fig. 3 the converter-inverter 14A may be of the commutator type having a pair of arcuate contacts 16 rotated in synchronism with the signal voltage, as by motor 17A of suitable type. One pair of fixed contacts or brushes 15 is connected to terminals of the series resistor 12 and the other pair of stationary contacts or brushes 15 is connected to the signal condenser 19. In the particular form shown, the arcuate contacts are somewhat less than 180° in angular extent, and the brushes 15 are spaced 90° apart around the axis of rotation of contacts 16. The operation of this type of converter in producing a derived signal is essentially the same as that of Fig. 1, and, accordingly, specific description thereof is unnecessary. Again, as in Fig. 1, the inverter-converter condenser circuit is a two-terminal network, both the parent input signal and the derived output signal appearing across the same two terminals.

Figure 4:
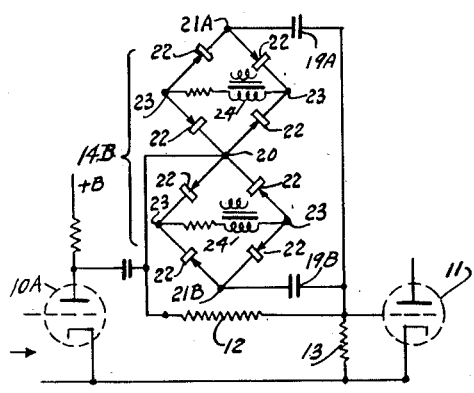
Figs. 3 and 4 are generally similar to Fig. 1 but utilize different forms of inverter-converters.

The inverter-converter network 14B of Fig. 4, involving no rotating or moving mechanism, may be used instead of the vibratory converter of Fig. 1 or the rotating converter of Fig. 3. In this modification, one terminal of the series resistor 12 is connected to the common terminal 20 of two rectifier bridges whose other terminals 21A and 21B are respectively connected through the capacitors 19A, 19B to the other terminal of series-resistor 12. Between the power supply terminals 23, 23 of each of the two bridges, there is connected a source of supply voltage, generically represented by a transformer 24, having the same frequency F as the unbalance signal and similarly phased with respect to each other when the rectifier poling is as shown. On one alternation of frequency F, the four rectifiers 22 of the upper bridge are rendered conductive. On the following alternation, the rectifiers 22 of the lower bridge are rendered conductive. At all times the bridge currents are larger than what might be supplied by the signal to the bridge networks. Consequently, the bridges act as a single-pole double-throw switch operated in synchronism with frequency F. The charge of each of the capacitors, as in the preceding arrangements, is therefore a function of the previous history of the signal voltage. The network, in manner analogous to that of the vibratory converter of Fig. 1, reconverts the direct-current charges of the capacitors 19A, 19B to an alternating signal of the same frequency as the original signal voltage, but of opposite phase as applied to the tube 11 or other signal-transfer device. As in Figs. 1 and 3, the inverter-converter condenser circuit is a two-terminal network, both the parent input signal and the derived output signal appearing across the same pair of terminals. In this, as well as other modifications, the coupling transformer 10 may be replaced by a coupling tube 10A.

It is typical of all three modifications shown in Figs. 1, 3 and 4 that upon sudden increase of signal voltage at the input terminals to the signal channel that there is initially a correspondingly sudden increase of the control voltage applied to the input electrodes of the subsequent tube 11 or equivalent device at the output terminals of the signal channel, and that shortly thereafter the effective voltage to tube 11 is progressively decreased.

Although in the self-rebalancing system shown in Fig. 5 there is utilized the particular form of converter-inverter shown in Fig. 1, it shall be understood that equivalent arrangements, including those shown in Figs. 3 and 4, may be used. The measuring network 30 of Fig. 5 is an alternating-current bridge including in one of its arms a resistor 25 whose effective resistance varies in predetermined manner with the temperature to which it is exposed. The terminals 24, 29 are the power-input terminals of the bridge and the terminals 31, 31 are the signal-output terminals. The slidewires 26, 26 are calibrated so that the relative positions of the slidewires with respect to their contacts correspond, at balance of the bridge, with the temperature to which resistor 25 is exposed. Balance of the bridge is maintained and an indication or record of the varying temperature is effected by a rebalancing motor 27 mechanically coupled, as indicated by broken lines, to the slidewires and to the recorder stylus or indicating pointer 41. As well known in the art, the motion of the slidewire shaft may be utilized, usually through switch contacts or an impedance of a telemetric system, to actuate a valve, or other device generically represented by block 28, for control of an agent affecting the magnitude of the measured condition.

The control of the motor is effected, as hereinafter described, in response to unbalance of the measuring network 30, the output voltage of which is applied, as by transformer 10, to a signal channel including in the particular arrangement shown the amplifier tubes 32, 33, 11 and 34. The effective amplification of the signal is preferably variable, as by the manually-adjustable potentiometer 35 in the input circuit of one of the tubes such as the second-stage tube 33.

The output circuit of one of the amplifier tubes, preferably that of an intermediate stage, includes a potential divider 12, 13 such as previously described in connection with Figs. 1, 3 and 4. Accordingly, the motor-control signal applied to the input electrodes of tube 11 depends, as above described, not only upon the existing unbalance of the measuring network 30 but also upon the history thereof as recognized by the inverter-converter network. The control signal is amplified by tube 11 and applied to the input electrodes of the power tube 34 having in its output circuit a winding 36 of the rebalancing motor 27. The other winding 37 of the motor is continuously energized from a suitable source of alternating current 38 which is either the same source used for supplying current to the measuring network or has fixed phase relation with respect thereto. Consequently, for unbalance of the bridge in one sense, the motor 27 is energized for rotation in one direction to restore balance whereas for unbalance of the measuring circuit in opposite sense, the motor winding 36 is energized in reverse phase relation to effect rotation of motor 27 in opposite direction to restore balance. Because of effect of the derived signal produced by the converter-inverter 14, the motor winding 36 is deenergized before the slidewires 26 reach the position corresponding with rebalance of the measuring network so that the motor coasts to the position of balance. For motor 27 of Fig. 5 there may be substituted the split-field motor shown in Fig. 4 of U. S. Letters Patent No. 2,113,164, and for tube 34 may be substituted a push-pull stage using high-vacuum tubes. With either arrangement of output stage and motor, the inverter-converter 14 derives from the alternating current unbalance signal a modifying signal both of which are used in control of motor 27 in avoidance of continued hunting or oscillation about the balance point.

The recorder chart 40 may be driven by any constant speed motor, such as synchronous motor 39 energized from the power source 38, which may be a 110 volt, 60 cycle power line.

The operating voltages and currents for the amplifier tubes of the signal channel may be supplied by a transformer 42 whose primary is connected to the power source 38 and whose secondary winding is connected to a rectifier tube 43 having in its output circuit a filter network 44 whose series elements may conveniently also serve as dropping resistors for obtaining the proper direct-current voltages for the plates and screens of the amplifier tubes. The secondary winding of transformer 42 may also be tapped to provide the proper operating voltage for the driving coil 17 of the synchronous converter 14. The driving-coil circuit may include reactance, generically represented by condenser 48, selected or adjusted to obtain the proper phasing of the vibratory contact 16.

The same or another secondary winding of transformer 42 may be used to provide the operating voltage for the measuring bridge 30. The desired magnitude and phase of the bridge current may be obtained by selection or adjustment of the resistors 45, 46 and condenser 47.

The temperature measuring network of Fig. 5 may, of course, be replaced by any other measuring network, including any of those shown in Patent No. 2,367,746, providing for impression upon the signal channel of an alternating voltage whose magnitude and phase depends upon departure of any condition to be measured and which can be reduced to zero by a measuring-circuit adjustment effected by the rebalancing motor 27, or equivalent.

In the modification shown in Fig. 6, the inverter-converter 14, which may be any of the types shown in Figs. 1, 3 and 4, or their equivalent, is in shunt to the input electrodes of tube 11. Thus, assuming an abrupt rise of signal voltage E from zero, Fig. 7, the effective impedance across the input electrodes of tube 11 is initially low and progressively increases during continuance of the signal because of charging of condensers 19A, 19B by the signal current as rectified by converter 14. As indicated by curve S of Fig. 7, the alternating voltage of the grid gradually increases at rate determined by the time constant of the charging circuit including resistor 12 and capacitors 19A, 19B. The signal voltage is rectified by the synchronous engagement of movable contact 16 with the fixed contacts 15, 15 progressively to charge the condensers. Initially the control voltage applied to the input electrodes of tube 11 is therefore small and progressively increases during continuance of the signal at constant or increasing magnitude. Upon abrupt cessation of the signal voltage, the condenser charge because of the extremely high value of resistor 12 tends to remain substantially constant. Eventually, it gradually disappears and the control signal applied to tube 11 correspondingly falls toward zero as indicated by that portion of dotted line curve S to the right of the abrupt fall of the parent signal voltage E. The rate at which the control signal returns to zero after the parent signal has become zero depends upon the time-constant of the discharge path, including resistor 12. In this integrator arrangement, the inverter-converter condenser circuit, as in the differentiator arrangements previously described, is a two-terminal network. For integration, this network as viewed from the input terminals of the signal channel is in series with resistor 12, and as viewed from the output terminals of the channel is in a path shunting the channel.

When it is desirable that the control voltage applied to the input electrodes of the tube 11 include a component proportional to the existing unbalance, resistor 13, low compared to resistor 12, is included in series with the inverter-converter 14 between the input electrodes of tube 11 as shown in Fig. 8. In this case, as shown by curve S of Fig. 9, upon abrupt rise of the signal voltage, there is immediately produced across resistor 13 a voltage which is in phase with and proportional to the unbalance, and the slow voltage rise, due to the integrating action of the converter-inverter 14 and capacitors 19A, 19B is gradually added thereto as shown by the rising portion of curve S, Fig. 9. Upon cessation of the unbalance signal, the grid or control voltage abruptly drops because of the component produced across resistor 13. The alternating voltage derived from the capacitors 19A, 19B tends to remain constant but eventually drops as the capacitors discharge. The amount of proportional action is largely determined by the relative values of the resistors 12 and 13: the slope of the curve S is largely determined by the relative magnitudes of the capacitors 19A, 19B and the resistance of resistor 12. In this modification, the two-terminal inverter-converter condenser network, as viewed from the input terminals of the signal channel, is in series with resistors 12 and 13, and as viewed from the output terminals of the channel is in a shunt path including resistor 13 and the network in series with each other.

As exemplary of an automatically self-balancing system utilizing the integrator arrangement of Fig. 6 or Fig. 8, reference is made to Fig. 10. This electrolytic titrometer, except for the self-balancing features hereinbefore discussed, is similar to one disclosed in copending application Serial No. 564,536 of a co-worker Eckfeldt to which reference is made for a more complete discussion of features therein claimed.

In brief, the system is one in which the rate that current must be supplied to electrolyzing electrodes in the fluid under test in order to obtain a predetermined ion-concentration is a measure of total acidity or alkalinity of the fluid. By utilization of the present invention, the electrolyzing current is automatically regulated to maintain the desired end point during variation of the acidity, alkalinity or rate of flow of the fluid being analyzed.

To give a specific example, it is assumed an aqueous solution of hydrochloric acid is flowing through pipe 49 to a point of utilization or storage. A side stream is diverted therefrom by pipe 50 and is passed to a flow channel 52 preferably by way of an adjustable constant head device 51. The liquid is electrolyzed as it passes a pair of electrodes 55, 56 disposed in the flow channel. The electrolyzing action upon the liquid between the anode 55, preferably of silver, and the cathode 56, preferably of platinum, produces chemical reactions characterized by union of the chlorine from the acid with silver from the anode to form silver chloride which is practically insoluble, and, hence, is effectively removed from the solution; at the same time, hydrogen is released at cathode 56. The current between the electrolyzing electrodes 55, 56 is automatically regulated to effect combination of all of the chloride ions of the acid with the silver from the anode, leaving a solution free of acid. For detecting when this desired condition obtains, or when there is insufficient electrolyzing action requiring readjustment of the electrolyzing current, there is utilized a second pair of electrodes 57, 58, one of which is a suitable pH electrode, such as a glass electrode, a hydrogen electrode, or an antimony electrode, in combination with suitable reference electrode such as a calomel electrode with a salt bridge: electrodes of these types are shown in U. S. Letters Patent No. 1,108,293, Perley, and No. 2,387,727, Godshalk.

The adjustable contact of a calibrated direct-current potentiometer 59 is set to correspond with that magnitude of unidirectional potential developed by electrodes 57, 58 which corresponds with the desired end point, specifically neutrality. The potentiometer voltage and the voltage of the pH cell are oppositely poled and are alternately applied to the input circuit of amplifier tube 61 by a vibratory converter 60. Under normal condition, the slight unbalance of these two direct-current voltages is converted to an alternating current signal voltage of predetermined phase which is amplified by the high-gain alternating-current amplifier comprising tubes 61, 62 and 63. The output of the final tube 63 is rectified by tube 64, and after the rectified current is smoothed by filter 65, it is supplied to the electrolyzing electrodes 55, 56. Tube 63 may be coupled to the rectifier 64 by a transformer 67 having a winding 68 which injects a desired percentage of the output voltage into a preceding stage as a reverse or degenerative feedback voltage. Preferably, the rectifier 64 is of the grid-controlled type, and there is applied to its grid an alternating current bias of frequency F so phased that there is avoided possibility of increase of current to electrodes 55, 56 in event there should occur, as might happen momentarily, a reversal of phase of the input signal voltage.

In one of the amplifier stages, preferably an intermediate stage, there is included effectively in shunt to the signal channel a converter-inverter 14 such as shown in preceding figures, operated in synchronism with the input converter 60 so that there is obtained an integration of the unbalanced signal as above discussed in connection with Figs. 6 and 8. Accordingly, the magnitude of the electrolyzing current to electrodes 55, 56 is automatically and smoothly regulated continuously to maintain the desired end point under varying conditions of acidity, alkalinity or rate of flow of the test stream. The electrolyzing current as read from a suitable indicator or recorder, generically represented by meter 66, therefore, continuously shows the total acidity or alkalinity of the fluid under test.

For those cases in which the desired end point cannot conveniently be effected by electrolysis of the test liquid itself, reagent may be added thereto at rate at least sufficient to insure attainment of the desired end point. For example, as shown, such reagent may be supplied from pipe 53, preferably through a constant head device 54, for admixture with the test solution suitably in advance of the electrolyzing electrodes 55, 56.

It shall be understood the foregoing is but one example of self-balancing systems in which the converter-inverter integrator of Figs. 6 or 8 may be used to advantage.

It shall further be understood that for some types of control, it may be desirable to include both differentiation and integration. As shown, this can be effected in the same stage, Fig. 11, or in parallel stages, Fig. 12.

It shall further be understood that a series inverter-converter may be used in one stage for differentiation and in a preceding or subsequent stage, there may be used a shunt converter-inverter for integration.

In view of the preceding discussion, specific explanation of Figs. 11 and 12 does not appear necessary particularly as the elements thereof corresponding with similar elements of preceding modifications are identified by the same reference characters, in some instances having letter suffixes or prefixes to distinguish between duplicated elements.

In the system of Fig. 12, if the resistor 12A be omitted, i. e., is of infinitely high resistance, the voltage applied to the input electrodes of tube 11A is the first derivative of the signal voltage applied to transformer 10 or equivalent, and has no component proportional to the unbalance. In the joint output of tubes 11A, 11B, however, there is such proportional component because of resistor 13B in the input circuit of tube 11B.

What is claimed is:

1. In a self-balancing electrical system including alternating-current control-means responsive to an alternating-current signal corresponding with unbalance of the system, a two-terminal network comprising an inverter-converter and associated capacitance connected to derive from said unbalance signal a second alternating-current signal of magnitude which is an infinitesimal calculus time function of the unbalance signal, connections for applying alternating currents respectively corresponding with said signals to a common impedance for their addition in production of a voltage having components respectively corresponding with the unbalance and an infinitesimal calculus function thereof, and means for applying said voltage to said control means to regulate the rebalancing action.

2. In a self-rebalancing electrical system including alternating-current control-means responsive to an alternating-current signal corresponding with unbalance of the system, a two-terminal network comprising an inverter-converter and associated capacitance connected to differentiate said unbalance signal so to derive therefrom a second signal of opposite phase, connections for applying alternating currents respectively corresponding with said signals to a common impedance for their addition in phase opposition to produce thereacross a voltage having components respectively corresponding with the unbalance and its rate of change, and means for applying said voltage to said control means to restore balance without overshooting.

3. In a self-rebalancing electrical system including alternating-current control-means responsive to an alternating-current signal corresponding with unbalance of the system, a two-terminal network comprising an inverter-converter and associated capacitance network connected to integrate said unbalance signal so to derive therefrom a second signal of like phase, and means for applying said signals to said control means to restore and maintain balance.

4. In a self-balancing electrical system including alternating-current control-means responsive to an alternating-current signal corresponding with unbalance of the system, means comprising an inverter-converter and associated capacitance connected to differentiate said unbalance signal so to derive a second signal of opposite phase, means comprising a second inverter-converter and associated capacitance connected to integrate said unbalance signal so to derive a third signal of like phase, and means for applying said signals to said control means to regulate the rebalancing of said system.

5. An alternating-current signal channel including a series impedance element between an input and an output terminal thereof, a signal source connected across the input terminals of said channel, an output impedance connected across the output terminals of said channel, a synchronous converter-inverter connected to rectify the signal-voltage drop across said series element, and capacitance connected to said converter-inverter for charging by the rectified signal, said converter-inverter reconverting the direct-current charge of said capacitance to alternating current traversing said output impedance in phase-opposition to the signal.

6. An alternating-current signal channel having a series impedance element between input and output terminals, a synchronous converter-inverter connected in series with said element in a path between the input terminals of the channel to rectify the signal current passed by said element, capacitance connected to said converter-inverter for charging by the rectified signal, said converter-inverter reconverting the direct-current charge of said capacitance to an alternating-current voltage in phase-opposition to said signal, and connections including said inverter-converter and said capacitance in series between the output terminals of said channel.

7. An alternating-current signal channel including an electronic tube, an alternating-current source of signal voltage, a resistor, a second resistor in shunt to the input electrodes of said tube and in series with said first resistor and said source to form a voltage-divider, a synchronous converter-inverter connected in shunt to said first resistor for conversion of the signal-voltage drop thereacross to a direct-current voltage, and capacitance connected to said converter-inverter for charging by the rectified signal, said converter-inverter reconverting the direct-current charge of said capacitance to a derived signal applied by said second resistor to the input electrodes of the tube in phase-opposition to the original signal.

8. An alternating-current signal channel including an electronic tube, an alternating-current source of signal voltage, a resistor in series with said source in the input circuit of said tube, a synchronous converter-inverter in series with said resistor and in a path in shunt to the input electrodes of said tube, and capacitance in circuit with said converter-inverter charged by signal current passed by said resistor and rectified by said converter-inverter, the direct-current charge of said capacitance being reconverted by said converter-inverter to a derived signal applied to said input electrodes.

9. An alternating-current signal channel including an electronic tube, a resistor in series in the input circuit of said tube, a second resistor in shunt to the input electrodes of said tube, a converter-inverter in series with said second resistor and in shunt to said input electrodes, and capacitance charged by signal current passed by said resistors and rectified by said converter-inverter, said converter-inverter reconverting the charge to an alternating-current voltage of the same phase as the signal voltage.

10. An alternating-current signal channel including an electronic tube, an alternating-current source of signal voltage, resistance means in series with said source in the input circuit of said tube, a synchronous vibratory converter-inverter having its vibratory contact structure connected to said circuit on one side of said resistance means, and a pair of capacitors each connected from one of the fixed contacts of said converter-inverter to said circuit on the other side of said resistance means.

11. An alternating-current signal channel including an electronic tube, resistance means in series in the input circuit of said tube, a synchronous vibratory converter-inverter having its vibratory contact structure connected to said circuit between said resistance means and one input electrode of said tube, and a pair of capacitors each connected from one of the fixed contacts of the converter-inverter to the other input electrode of said tube.

12. An alternating-current signal channel including an electronic tube, resistance means in a path in shunt to the input electrodes of said tube, a pair of capacitors, and means for alternately including said capacitors in said path in series with said resistance means comprising a synchronous vibratory converter-inverter having its fixed contacts respectively connected to said capacitors.

13. In a system including an alternating-current signal amplifier whose output is utilized for rebalancing of the system, the method of controlling the rebalancing which comprises in one stage of said amplifier performing the steps of rectifying the unbalance signal voltage, charging a capacitance by the rectified signal to produce a unidirectional voltage whose magnitude is a function of the rate of change of the signal, converting said unidirectional voltage to an alternating-current signal of opposite phase, and in the same stage or another stage of said amplifier performing the steps of rectifying the unbalance signal voltage, charging a capacitance by the rectified signal to produce a second unidirectional voltage whose magnitude is a time integral function of the signal, and converting said second unidirectional voltage to an alternating-current signal of the same phase as the signal from which derived.

14. An alternating-current signal channel comprising a source of signal voltage, a two-terminal network comprising a synchronous inverter-converter and capacitance means, an output impedance traversed by currents from said source and said network to produce an output voltage having components respectively corresponding with said signal voltage and a time function thereof, and an amplifier having input terminals respectively connected to one terminal of said source and to a common terminal of said impedance and said network for application to said amplifier terminals of said output voltage.

15. An alternating-current signal channel comprising a source of signal voltage, a two-terminal network comprising a synchronous inverter-converter and capacitance means, an impedance in series in a path including said source and said network, and an amplifier having input terminals respectively connected to terminals of said network.

16. An alternating-current signal channel comprising a source of signal voltage, a two-terminal network comprising a synchronous inverter-converter and capacitance means, an output impedance in series with said source and said network for traverse of said output impedance by currents from said source and said network to produce an output voltage having components respectively corresponding with said signal voltage and its rate of change, and an amplifier having input terminals respectively connected to terminals of said output impedance.

17. An alternating-current signal channel having input and output terminals, an alternating-current signal source connected to said input terminals, a two-terminal network including a synchronous inverter-converter and capacitance means, resistance means, connections including said resistance means and said network in series in a path between said input terminals, and connections from said output terminals to the terminals of said network.

18. An alternating-current signal channel having input and output terminals, an alternating-current signal source connected to said input terminals, resistances connected in series between said input terminals, a two-terminal network connected in shunt to one of said resistances and including a synchronous inverter-converter and capacitance means, and connections from said output terminals to another of said resistances.

19. An alternating-current signal channel having input and output terminals, an alternating-current signal source connected to said input terminals, a two-terminal network including a synchronous inverter-converter and capacitance means, resistances connected in series with each other and with said network between said input terminals, and connections including said network and one of said resistances in series with each other between said output terminals.

ALBERT J. WILLIAMS, Jr.

REFERENCES CITED

The following references are of record in the file of this patent:

UNITED STATES PATENTS

| Number | Name | Date |
| --- | --- | --- |
| 2,300,742 | Harrison et al. | Nov. 3, 1942 |
| 2,352,953 | Haight | July 4, 1944 |
| 2,385,447 | Jones | Sept. 25, 1945 |
| 2,409,970 | Agins | Oct. 22, 1946 |
| 2,445,773 | Frost | July 27, 1948 |

OTHER REFERENCES

"Differentiating and Integrating Circuits," by James G. Clarke, McGraw-Hill Publication, "Electronics" for November 1944, pp. 138-142, inclusive.